United States Patent
Heppe et al.

(10) Patent No.: US 11,524,229 B2
(45) Date of Patent: Dec. 13, 2022

(54) METHODS, SYSTEMS, AND MEDIA FOR ENHANCING MULTIPLAYER GAME SESSIONS WITH ASYMMETRIC INFORMATION

(71) Applicant: GOOGLE LLC, Mountain View, CA (US)

(72) Inventors: Travis Jon Heppe, Alameda, CA (US); Jeff Foster Fry, Oakland, CA (US)

(73) Assignee: GOOGLE LLC, Mountain View, CA (US)

( * ) Notice: Subject to any disclaimer, the term of this patent is extended or adjusted under 35 U.S.C. 154(b) by 93 days.

(21) Appl. No.: 16/849,675

(22) Filed: Apr. 15, 2020

(65) Prior Publication Data

US 2020/0238171 A1 Jul. 30, 2020

Related U.S. Application Data

(63) Continuation of application No. 15/850,590, filed on Dec. 21, 2017, now Pat. No. 10,661,165, which is a
(Continued)

(51) Int. Cl.
*A63F 13/31* (2014.01)
*A63F 13/323* (2014.01)
(Continued)

(52) U.S. Cl.
CPC ............. *A63F 13/31* (2014.09); *A63F 13/26* (2014.09); *A63F 13/27* (2014.09); *A63F 13/323* (2014.09)

(58) Field of Classification Search
CPC ......... A63F 13/31; A63F 13/323; A63F 13/27
See application file for complete search history.

(56) References Cited

U.S. PATENT DOCUMENTS 8,881,304 B2 * 11/2014 Vrielink ................ H04L 63/108
726/29
2011/0105206 A1 * 5/2011 Rowe ................... G07F 17/3272
463/43
(Continued)

*Primary Examiner* — James S. McClellan

(57) ABSTRACT

Mechanisms for enhancing multiplayer games are provided. In some implementations, the method comprises: detecting presence of a display device on a communications network; causing joining instructions to connect to a multiplayer game session to be displayed on the display device, wherein the joining instructions include server information for handling communications relating to the multiplayer game session over the communications network; receiving, from user devices over other communications networks, a request to join the multiplayer game session in response to displaying the joining instructions on the display device, wherein each of the user devices has a user display device; connecting each of the user devices over one of the other communications network to the display device presenting the multiplayer game session; initiating the multiplayer game session; determining, for the multiplayer game session, a first portion of game information to be presented on the display device and a second portion of game information to be presented on the user display device; and causing the first portion of game information to be displayed on the display device and the second portion of game information to be displayed on the user displayed device based on the determination.

21 Claims, 3 Drawing Sheets

Related U.S. Application Data continuation of application No. 14/674,483, filed on Mar. 31, 2015, now Pat. No. 9,873,043.

(60) Provisional application No. 61/973,039, filed on Mar. 31, 2014.

(51) Int. Cl.
*A63F 13/26* (2014.01)
*A63F 13/27* (2014.01)

(56) References Cited

U.S. PATENT DOCUMENTS

| | | | | |
|---|---|---|---|---|
| 2011/0269436 A1* | 11/2011 | Porco | ............... | G07F 17/32 455/414.1 |
| 2014/0018155 A1* | 1/2014 | Nelson | ............... | G07F 17/3225 463/25 |
| 2014/0256407 A1* | 9/2014 | Graf | ............... | G07F 17/3225 463/22 |

* cited by examiner

METHODS, SYSTEMS, AND MEDIA FOR ENHANCING MULTIPLAYER GAME SESSIONS WITH ASYMMETRIC INFORMATION

CROSS-REFERENCE TO RELATED APPLICATIONS

This application is a continuation of U.S. patent application Ser. No. 15/850,590, filed Dec. 21, 2017, which is a continuation of U.S. patent application Ser. No. 14/674,483, filed Mar. 31, 2015, which claims the benefit of U.S. Provisional Patent Application No. 61/973,039, filed Mar. 31, 2014, which are hereby incorporated by reference herein in their entireties.

TECHNICAL FIELD

Methods, systems, and media for enhancing multiplayer game sessions with asymmetric information are provided.

BACKGROUND

Video games are becoming increasingly popular. In general, a game console provides game information to each participant, where the participant performs game functions based on the provided game information. In some of these video games, asymmetric information is often involved. For example, in a card game, a participant views his or her own cards, but not the cards associated with other players. In such video games being played on a game console or gaming device, the gaming device is required to passed from player to player to perform and/or respond to player-specific actions.

Accordingly, it is desirable to provide methods, systems, and media for enhancing multiplayer game sessions with asymmetric information.

SUMMARY

In accordance with some implementations of the disclosed subject matter, mechanisms for enhancing multiplayer game sessions with asymmetric information are provided.

In accordance with some implementations of the disclosed subject matter, a method for enhancing multiplayer games is provided, the method comprising: detecting presence of a display device on a communications network; causing joining instructions to connect to a multiplayer game session to be displayed on the display device, wherein the joining instructions include server information for handling communications relating to the multiplayer game session over the communications network; receiving, from a plurality of user devices over a plurality of other communications networks, a request to join the multiplayer game session in response to displaying the joining instructions on the display device, wherein each of the plurality of user devices has a user display device; connecting each of the plurality of user devices over one of the plurality of other communications network to the display device presenting the multiplayer game session; initiating the multiplayer game session; determining, for the multiplayer game session, a first portion of game information to be presented on the display device and a second portion of game information to be presented on the user display device; and causing the first portion of game information to be displayed on the display device and the second portion of game information to be displayed on the user displayed device based on the determination.

In accordance with some implementations of the disclosed subject matter, a system for enhancing multiplayer games is provided, the system comprising: a hardware processor that is configured to detect presence of a display device on a communications network; cause joining instructions to connect to a multiplayer game session to be displayed on the display device, wherein the joining instructions include server information for handling communications relating to the multiplayer game session over the communications network; receive, from a plurality of user devices over a plurality of other communications networks, a request to join the multiplayer game session in response to displaying the joining instructions on the display device, wherein each of the plurality of user devices has a user display device; connect each of the plurality of user devices over one of the plurality of other communications network to the display device presenting the multiplayer game session; initiate the multiplayer game session; determine, for the multiplayer game session, a first portion of game information to be presented on the display device and a second portion of game information to be presented on the user display device; and cause the first portion of game information to be displayed on the display device and the second portion of game information to be displayed on the user displayed device based on the determination.

In accordance with some implementations of the disclosed subject matter, a non-transitory computer-readable medium containing computer-executable instructions that, when executed by a processor, cause the processor to perform a method for enhancing multiplayer games is provided. The method comprising: detecting presence of a display device on a communications network; causing joining instructions to connect to a multiplayer game session to be displayed on the display device, wherein the joining instructions include server information for handling communications relating to the multiplayer game session over the communications network; receiving, from a plurality of user devices over a plurality of other communications networks, a request to join the multiplayer game session in response to displaying the joining instructions on the display device, wherein each of the plurality of user devices has a user display device; connecting each of the plurality of user devices over one of the plurality of other communications network to the display device presenting the multiplayer game session; initiating the multiplayer game session; determining, for the multiplayer game session, a first portion of game information to be presented on the display device and a second portion of game information to be presented on the user display device; and causing the first portion of game information to be displayed on the display device and the second portion of game information to be displayed on the user displayed device based on the determination.

In accordance with some implementations of the disclosed subject matter, a system for enhancing multiplayer games is provided, the system comprising: means for detecting presence of a display device on a communications network; means for causing joining instructions to connect to a multiplayer game session to be displayed on the display device, wherein the joining instructions include server information for handling communications relating to the multiplayer game session over the communications network; means for receiving, from a plurality of user devices over a plurality of other communications networks, a request to join the multiplayer game session in response to displaying the joining instructions on the display device, wherein each of the plurality of user devices has a user display device; means for connecting each of the plurality of user devices over one of the plurality of other communications network to the display device presenting the multiplayer game session; means for initiating the multiplayer game session; means for determining, for the multiplayer game session, a first portion of game information to be presented on the display device and a second portion of game information to be presented on the user display device; and means for causing the first portion of game information to be displayed on the display device and the second portion of game information to be displayed on the user displayed device based on the determination.

In some implementations, the joining instructions include machine-readable code that, without user interaction from a user of one of the plurality of user devices, causes a web browsing application executing on a user device to access a uniform resource locator associated with the multi-player game session and join the multi-player game session having one or more game parameters.

In some implementations, the joining instructions initiate a gaming application associated with the multi-player game session to be transmitted to a user device.

In some implementations, the joining instructions cause one or more game parameters associated with the multi-player game session to be transmitted to a user device.

In some implementations, the system further comprises means for connecting to a gaming device that executes the multiplayer game session, wherein a uniform resource locator is generated for handling the communications relating to the multiplayer game session, wherein the plurality of user devices are not connected to the gaming device and wherein the plurality of user devices are not connected to each other.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify the like elements.

DETAILED DESCRIPTION

Figure 1:
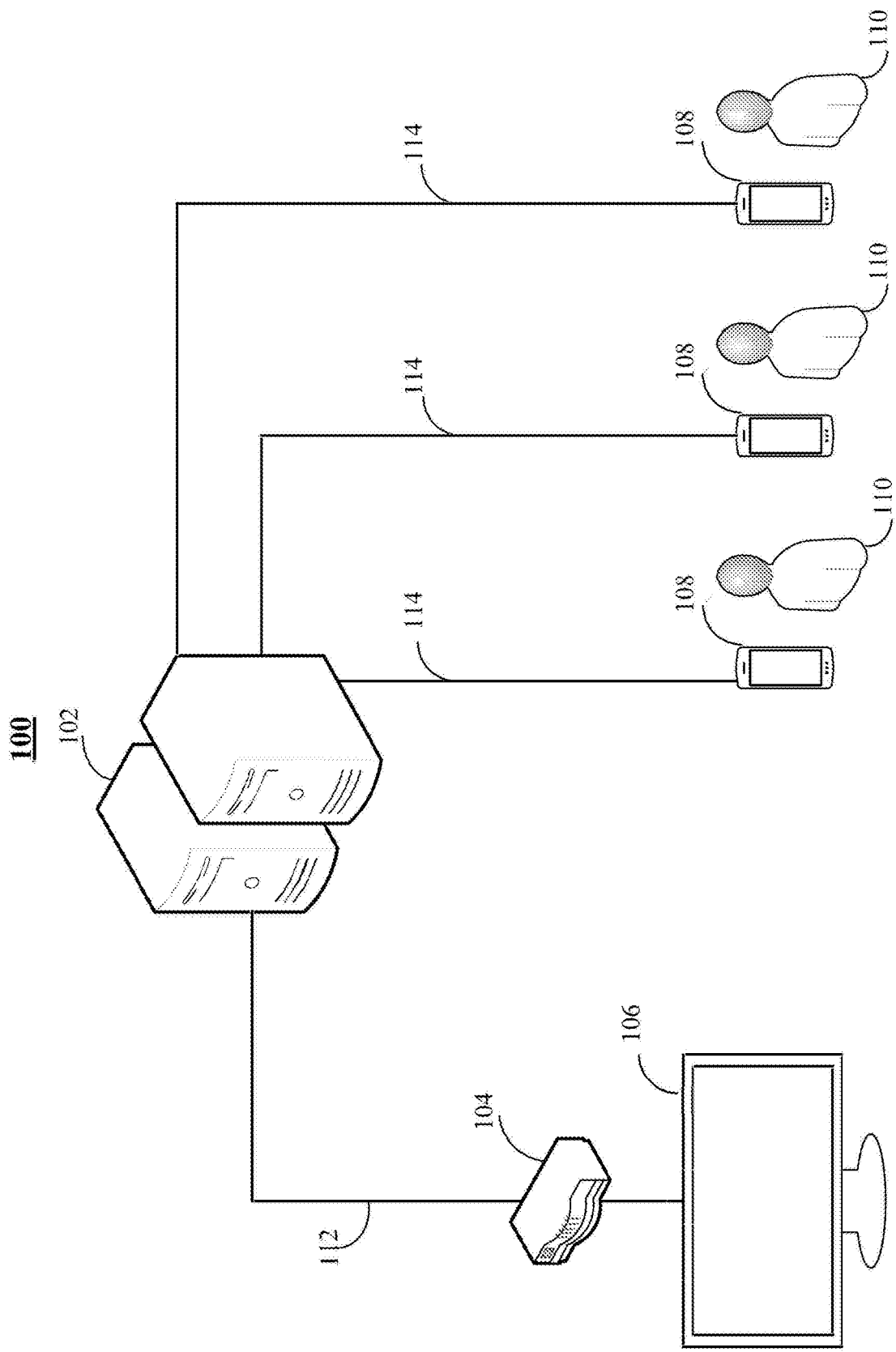
FIG. 1 is a block diagram of a system for providing asymmetric information in a multiplayer game session in accordance with the disclosed subject matter.

In accordance with some implementations of the disclosed subject matter, mechanisms for enhancing multiplayer game sessions with asymmetric information are provided.

Generally speaking, multiplayer games, such as massively multiplayer online games (MMOG) and multiplayer video games, involve distributing asymmetric information to multiple players. For example, in a multiplayer game session, some information is available to all of the players, while other information is only available to one or more particular players. In a card game, such as bridge or poker, a player can see his own hand, but the player cannot see the other players' hands. After the player plays a particular card, all of the players can see that card. To facilitate a multiplayer game, a gaming application can provide asymmetric information to multiple players. For example, the gaming application can cause information that is available to all players to be displayed on a connected display device that can be seen by all of the players. In a more particular example, the display device presenting information that is available to all of the players can be a public display device. As another example, the gaming application can cause information that is available only to one or more particular players to be displayed on one or more displays that can only be seen by the particular players. In a more particular example, the display device presenting information that is available only to one or more particular players can be a display connected to a user device.

In some implementations, the gaming application can cause a user interface to be presented on the display device (e.g., a television, a personal computer, a laptop, a public display device, etc.) that can be seen by all of the players, which can include game participants, spectators, potential participants, etc. Such a user interface can include any suitable information that can enable a group of players to initiate and/or join a multiplayer game session. For example, the user interface can include one or more machine-readable labels (e.g., two-dimensional barcodes, etc.) that contain information about the game session. In a more particular example, the user interface can include a Quick Response (QR) code. In some implementations, the QR code can include a uniform resource locator (URL) associated with a server that manages the game session, a set of parameters that are required to join the game session, etc.

In some implementations, a player can join the game session using a suitable user device, such as a mobile phone, a laptop, a tablet computing device, a wearable computing device, etc. For example, the player can join the game session by establishing a connection between a user device and a server (or other suitable computing device) by using the information displayed on the display device. In a more particular example, the player can join the game session by capturing an image of a QR code displayed on display device using a camera connected to the user device. In response to using the user device to capture the QR code, the user device can launch a browser application and access a URL embedded in the QR code that is associated with the game session. In this example, multiple players can join the game session by scanning the QR code using their respective user devices. It should be noted that the user devices are not required to be connected to each other via a direct connection. For example, each user device can access the URL through a network suitable to the particular user device, such as the Internet, a 3G network, a 4G network, etc.

It should be noted that the user devices, such as mobile devices, that are participating in the game session are not required to connect with each other via a direct connection and the user devices are also not required to connect with a gaming console or any other suitable gaming device.

It should also be noted that, in some implementations, the web browsing application executing on a user device, such as a mobile device, can use a script (e.g., Javascript code executed by the web browsing application) to join a game session. For example, in response to capturing a QR code, a user device can launch the web browsing application to go to a URL or any other suitable location embedded in the QR code and, using game parameters embedded in the QR code, the user device can join a particular game session. In this example, the downloading of a gaming application or any other suitable client application on the user device may not be required prior to participating in a game session. Alternatively, particular actions can be embedded in the QR code that are initiated upon capturing the QR code, such as accessing multiple URLs, obtain particular information from a server, and/or download a client portion of a gaming application.

In some implementations, the gaming application can initiate the multiplayer game session upon multiple players joining the game session. For example, the gaming application can cause a public display to present a two-dimensional code for joining a game session and wait to start the game session until a predetermined number of user devices have captured the two-dimensional code and accessed the corresponding URL to connect with the appropriate server. After the game session is started, the server can distribute asymmetric information to multiple players. For example, the server can transmit game information that is available to a particular player to a user device associated with the particular player. The user device can then generate one or more suitable user interfaces based on the game information and cause the user interfaces to be displayed. As another example, the gaming application can cause game information that is available to all of the players to be displayed on the display device and/or the displays of the user devices associated with all participating players. In a more particular example, after a card game session has started, the server can transmit to each user device gaming information about a set of cards that have been dealt to a player associated with the user device and cause the set of cards to be displayed on the display of each player's user device, respectively. After a player plays a card, the server can cause the information about that card to be displayed on the display device and the user device associated with each player.

Figure 2:
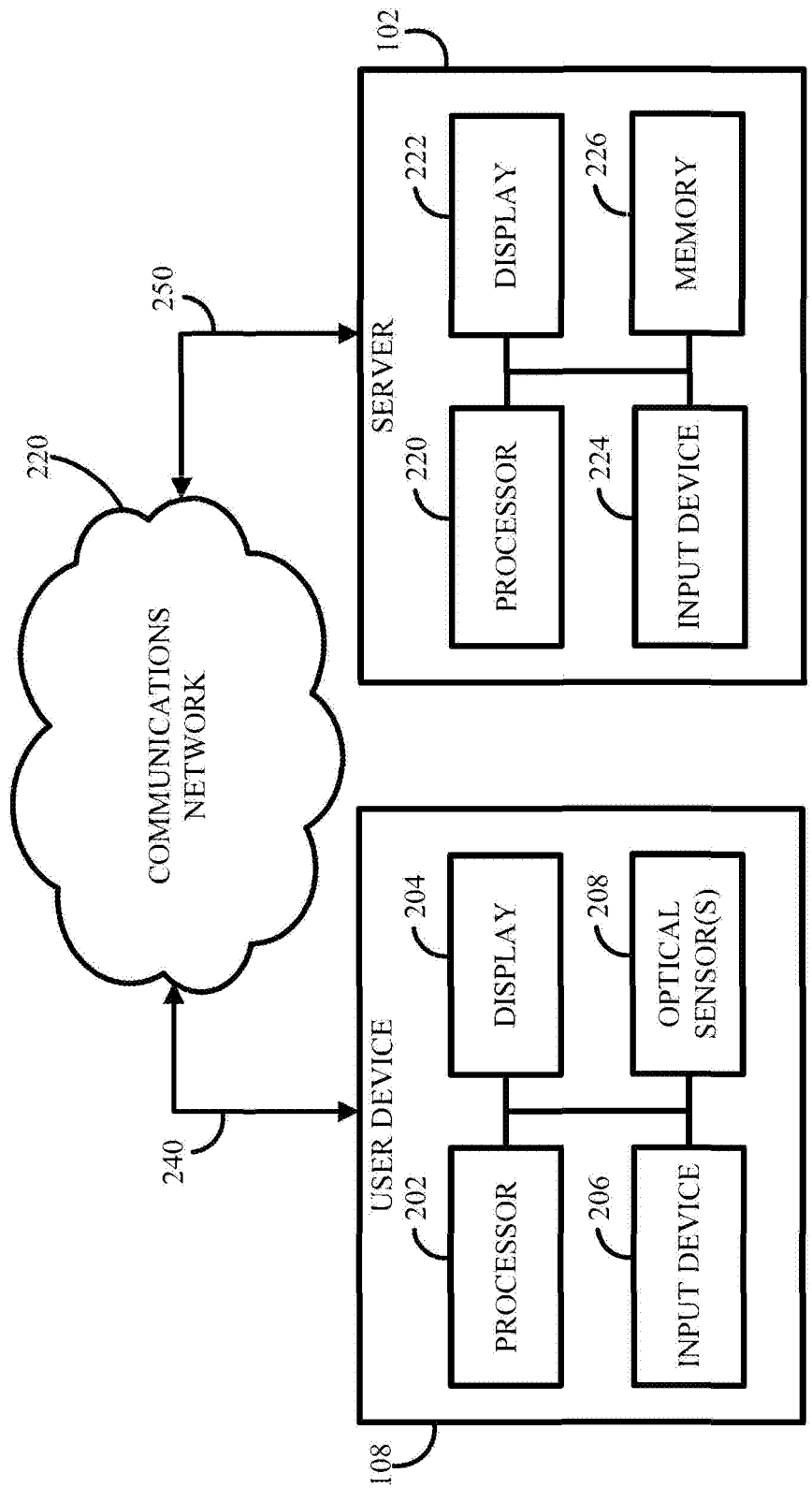
FIG. 2 is a block diagram of an illustrative user device and server as provided, for example, in FIG. 1 in accordance with some implementations of the disclosed subject matter.

Turning to FIG. 1, an example 100 of a system for enhancing multiplayer game sessions with asymmetric information in accordance with some implementations of the disclosed subject matter is shown. As illustrated, system 100 can include a server 102, a console 104, a display device 106, one or more user devices 108, and communication links 110, 112, and 114. In some implementations, one or more portions of, or all of, process 200 as illustrated in FIG. 2 can be implemented by server 102, console 104, display device 106, and/or one or more user devices 108.

Server 102 can include any suitable devices that are capable of receiving requests (e.g., to initiate a multiplayer game session), processing requests, sending responses, providing asymmetric information in a multiplayer game session, and/or performing other suitable functions. For example, server 102 can be implemented as a hardware processor, a computer, a data processing device, a tablet computing device, a multimedia terminal, a mobile telephone, a gaming device, a set-top box, a television, etc., or a combination of such devices.

Console 104 can be any suitable device that is capable of receiving asymmetric information in a multiplayer game, causing such information to be displayed, and/or performing other suitable functions. For example, console 104 can be implemented as a game console, a hardware processor, a computer, a tablet computing device, a television, etc., or a combination of such devices. In some implementations, console 104 can be implemented as a standalone device. Alternatively, console 104 can be integrated with display device 106.

Display device 106 can be any suitable device that is capable of receiving, converting, processing, and/or rendering media content, such as a streaming media player, a media center computer, a CRT display, a LCD, a LED display, a plasma display, a touch-screen display, a simulated touch screen, a television device, a tablet user input device, a mobile phone, etc. For example, display device 106 that is connected to server 102 can receive particular game information and joining instructions to display to game participants, potential participants, spectators, etc.

As shown in FIG. 1, system 100 can also include one or more user devices 108. User device 108 can be any suitable device that is capable of receiving user inputs in a game session, receiving requests and sending responses relating to asymmetric game information, causing game information to be displayed, and/or performing other suitable functions. For example, in some implementations, user device 108 can be a mobile phone, a tablet computing device, a laptop computer, a remote control, a wearable computing device, etc. In some implementations, user device 108 can include a display that is capable of presenting images, video content, etc., such as a LCD display, a touchscreen, etc. For example, the display can present user interfaces and/or other gaming information that only the particular user of the particular user device can view. In some implementations, user device 108 can run one or more web browsing applications and/or suitable web browser plug-ins or extensions to facilitate a web-based game.

In some implementations, as shown in FIG. 1, each user device 108 can be associated with a user 110. In a multiplayer game session, multiple users 110 can participate in the game session using multiple user devices 108. In some implementations, suitable media content relating to the multiplayer game session can be presented on display device 106 that can be seen by multiple players, which can include game participants, spectators, potential participants, etc.

In some implementations, each user device 108 can execute a gaming application that, in response to detecting a presence of a particular type of media device on a communications network (e.g., communications network 220 of FIG. 2), transmits an indication to the media device to join a multiplayer game session. In a more particular example, in response to detecting that a particular type of media device is near a display device, such as display device 106, server 102 can transmit instructions to join a multiplayer game session, where some of the game information corresponding to the multiplayer game session is displayed on display device 106 and some of the game information corresponding to the multiplayer game session is display on a display device associated with the media device.

In some implementations, each of console 104 and user device(s) 108 can be connected to server 102 through communication links 112 and 114, respectively. In some implementations, console 104 can be connected to display device 106 through communication link 116. Communication links 112, 114, and 116 can be any suitable communication links, such as network links, dial-up links, wireless links, hard-wired links, any other suitable communication links, or a combination of such links.

Referring back to FIG. 1, the server and one of the user devices depicted in FIG. 1 are illustrated in more detail in FIG. 2. Referring to FIG. 2, user device 108 may include processor 202, display 204, input device 206, and optical sensor 208, which may be interconnected. In some implementations, user device 108 can also include a storage device for storing a computer program for controlling processor 202, game information, and other suitable information.

Processor 202 can use the computer program to present on display 204 the gaming application and the data received through communications link 240 and commands and values transmitted by a user of user device 202. It should also be noted that data received through communications link 240 or any other communications links may be received from any suitable source. Input device 206 may be a computer keyboard, a mouse, a keypad, a cursor-controller, a gesture system, a remote control, or any other suitable input device as would be used by a designer of input systems or process control systems. Alternatively, input device 206 may be a finger or stylus used on a touch screen display 204. For receiving the voice commands, input device 206 may be a microphone.

Optical sensor 208 can include any suitable device that is capable of reading and/or scanning a machine-readable code, such as a camera, a scanner, a barcode reader, etc. For example, as described above, optical sensor 208 can be used to capture a machine-readable code that allows the user of the user device to join a game session—e.g., by accessing an associated URL encoded in the machine-readable code.

Server 102 may include processor 220, display 222, input device 224, and memory 226, which may be interconnected. In a preferred implementation, memory 226 contains a storage device for storing data received through communications link 250 or through other links, and also receives commands and values transmitted by one or more users. The storage device further contains a server program for controlling processor 220.

In some implementations, the application may include an application program interface (not shown), or alternatively, the application may be resident in the memory of user device 108 or server 102. In another suitable implementation, the only distribution to user device 108 may be a graphical user interface ("GUI") which allows a user to interact with the application resident at, for example, server 102.

In some implementations, any suitable computer readable media can be used for storing instructions for performing the processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In some implementations, the mechanisms may include client-side software, hardware, or both. For example, the application may encompass one or more Web-pages or Web-page portions (e.g., via any suitable encoding, such as HyperText Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches).

Figure 3:
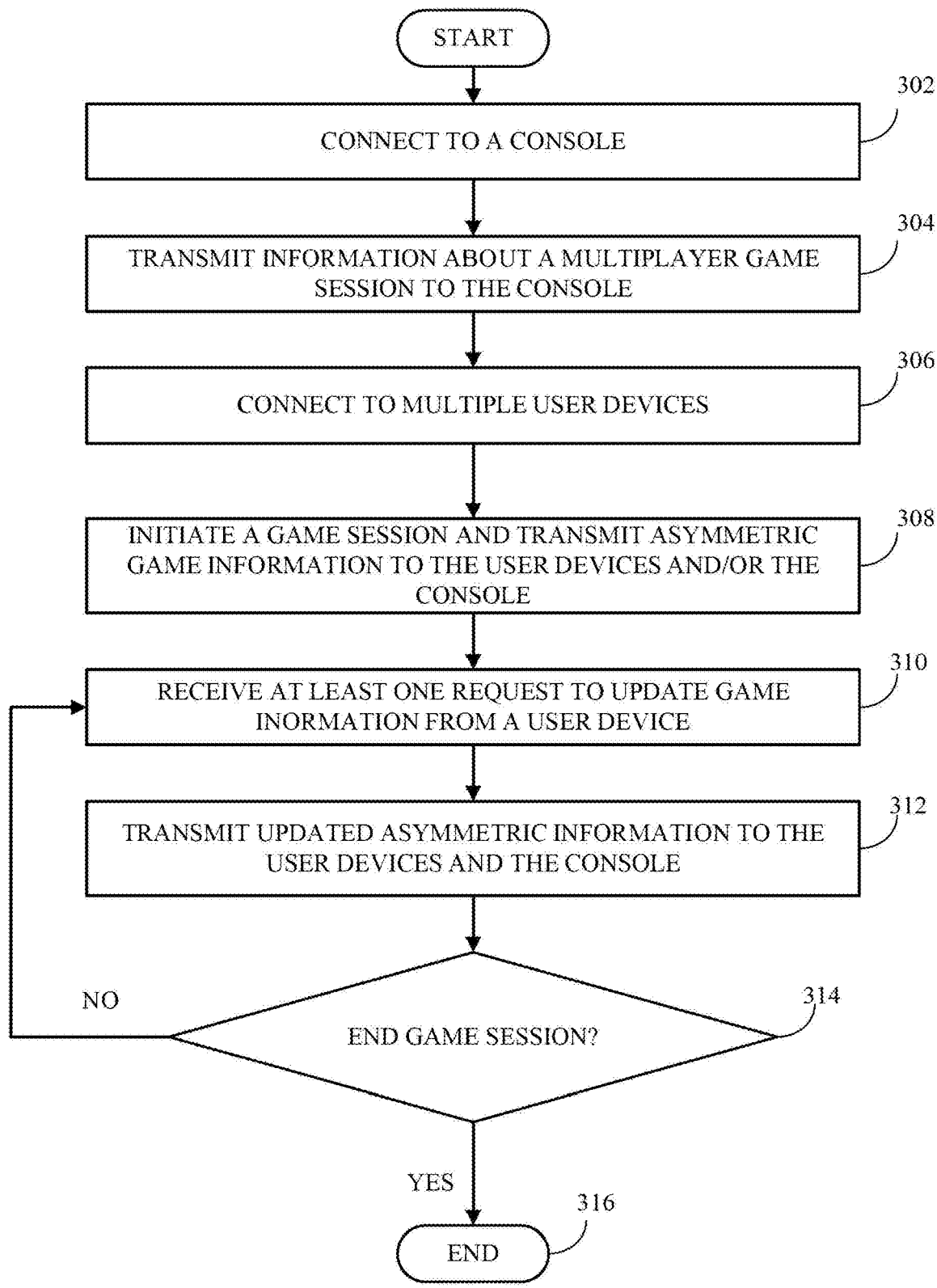
FIG. 3 is a flow chart of an illustrative process for providing asymmetric information in a multiplayer game session in accordance with the disclosed subject matter.

Turning to FIG. 3, an example 300 of a process for enhancing multiplayer game sessions with asymmetric information in accordance with some implementations of the disclosed subject matter is shown. In some implementations, process 300 can be implemented by a server, such as server 102 shown in FIGS. 1 and 2.

As illustrated, process 300 can begin by connecting to a console at 302. The server can be connected to the console in any suitable manner. For example, such connection can be established in response to one or more requests (e.g., HTTP requests, discovery protocol requests, etc.) transmitted from the console. In a more particular example, the console can launch a suitable web browsing application and open a uniform resource locator (URL) directed at the address of the server. The console and the server can then be connected through the Internet or other suitable networks.

In some implementations, upon connecting to the console, the server can transmit information about a multiplayer game session to the console at 304. Examples of such information can include the web address of the server, the URL associated with the server, a set of parameters that are needed to join the game session, video content, audio content, and other suitable content that can be used to generated one or more user interfaces to facilitate the multiplayer game session, etc. In some implementations, such information can be presented on a display device to prompt or promote users to join the multiplayer game session using one or more suitable user interfaces. In a more particular example, a user interface presented on the display device can include one or more machine-readable labels (e.g., two-dimensional barcodes, Quick Response (QR) codes, etc.) that can encode the URL associated with the server, the set of parameters that are needed to join a particular game session, and other suitable information that can be used to join the multiplayer game session.

At 306, the server can connect to multiple user devices. For example, each of the multiple user devices can be connected to the server through an independent communication connection. In a more particular example, a user using a user device can launch a browsing application and open the URL associated with the address of the server. The user device and the server can then be connected through a network suitable to the user device, such as the Internet, a 3G network, a 4G network, etc. In another more particular example, the user using an imaging component of the user device (e.g., a camera) can capture a two-dimensional code associated with a particular game session (e.g., the QR code displayed on the display device). In response to capturing the two-dimensional code that has a URL and/or game parameters embedded within the code, the user device can launch a browsing application that opens the URL associated with the server and initiate or join the game session using the embedded game parameters, thereby connecting the user device to the server. It should be noted that a user device may not be required to connect to other user devices via a direct communication connection. It should also be noted that a user device may be not required to connect to the console via direct communication connection.

As another example, the server can be connected to multiple user devices through a common communication network. Examples of the common communication network can include the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), or any combination of any of such networks. In a more particular example, each user can sign into the common communication network using a user device. The user device can then be connected to the server through the common communication network.

As yet another example, the server can detect the presence of user devices, such as particular types of media devices, that are connected to a network to which one or more display devices, such as public display devices, are connected. In this example, the server and/or the display device connected to the server can transmit a message on the current network directed to user devices and/or any suitable media device that processes and/or presents game information, such as user interfaces, corresponding to a multiplayer game session. Such a message can include server information for connecting to the multiplayer game session and/or any other suitable information.

Additionally or alternatively, a user device can detect the presence of one or more display devices, such as public display device, for joining a multiplayer game session and presenting game information. For example, when the media device is a mobile device, media device discovery of a nearby display device can be initiated on the network to which the mobile device is connected. It should be noted that media device discovery can be initiated by the mobile device at any suitable time and for any suitable reason or reasons. For example, the gaming application running on the mobile device can initiate media device discovery to determine whether the mobile device is on the same network as a display device. In another example, the gaming application running on the mobile device can initiate media device discovery in response to initiating the gaming application.

In some implementations, in response to connecting with multiple user devices, the server can initiate a multiplayer game session and transmit asymmetric game information to the user devices and the console at 208. More particularly, the server can determine which information and which user interfaces including at least a portion of the information to transmit to the user devices and/or the console. For example, the server can transmit to each user device video data (e.g., still images, moving images, etc.), audio data, text, and/or other suitable game data that can be used to facilitate the multiplayer game session. In some implementations, each user device can generate one or more user interfaces using the video data, audio data, and/or other game data during the multiplayer game session. The user device can then cause the user interfaces to be displayed.

As another example, the server can transmit information pertinent to a particular player to a user device associated with the particular player. In a more particular example, in a poker game, each player can be dealt with an appropriate number of cards (e.g., a player's pocket cards). In such an example, the server can transmit information about a player's pocket cards to a user device associated with the player and cause such information to be displayed on the user device. In some implementations, the server can transmit video content (e.g., still images, moving images, etc.), audio content, and other suitable content relating to the game session to the user device. The user device can then render the content relating to the game session on a display associated with the user device. In some implementations, the server can transmit to the user device one or more messages including the game information pertinent to the particular user. The user device can then generate and display one or more suitable interfaces (e.g., using Javascript) based on the received messages.

As yet another example, the server can transmit game information that is available to all of the players to the console. The console can then cause such game information to be displayed on the display device. In a more particular example, in a poker game, the server can distribute information about the identities of players who are forced to make a bet (e.g., the dealer, the big blind, the small blind, etc.), the amount of the bets, the community cards, and other information available to all of the players to the console. In some implementations, such information can also be transmitted to each of the user devices.

It should be noted that, in some implementations, the server can cause game information to be displayed on the display device, such as a public display device, while concurrently displaying joining instructions (e.g., for joining a multiplayer game session, for being placed in a queue to join the next multiplayer game session, etc.) on the display device. Additionally or alternatively, in response to determining that another nearby display device has availability for joining a multiplayer game session (e.g., a second multiplayer game session is about to begin and is accepting additional participants), the server can direct the user device using the joining instructions to the nearby display device.

At 310, the server can receive a request to change at least one game parameter from a user device. For example, a user using a user device can enter one or more user inputs to change a game parameter (e.g., placing abet, playing a card, exiting the game session, etc.). The user device can then transmit information relating to the user inputs to the server.

At 312, the server can transmit updated asymmetric information to the user devices and the console. For example, the updated asymmetric information can be generated based on the request(s) received at 310. In a more particular example, in response to receiving one or more requests to change a game parameter (e.g., by placing a bet), the server can transmit information relating to such requests to the console and/or one or more of the user devices that are connected to the server. The console can then cause such information to be displayed on the display device (e.g., by generating one or more suitable user interfaces based on such information).

As another example, the server can generate updated asymmetric information and distribute the updated asymmetric information to the console and/or one or more of the user devices to advance the game session. In a more particular example, in the example described above where a poker game is being held, the server can transmit information relating to one or more community cards to the console. The console can then generate one or more suitable user interfaces based on the information and cause the user interfaces to be displayed on the display device associated with the console. In another more particular example, the server can distribute information pertinent to a particular player to the user device associated with the particular player (e.g., information indicating that additional cards have been dealt to the particular player). In some implementations, the server can transmit the asymmetric game information in the form of video content (e.g., still images, moving images, etc.), audio content, and/or other suitable content. In some implementations, the server can transmit one or more messages including such game information to the console and/or the user devices. The console and/or the user devices can then generate video content (e.g., still images, moving images, etc.), audio content, and other suitable content to render such information on a suitable display.

At 314, the server can determine whether the game session has ended. For example, the game session can end when a player wins the game. As another example, the game session can end when multiple players have left the game session (e.g., such that a minimum number of players are not associated with that game session).

In some implementations, in response to determining that the game session has not ended at 314, process 300 can return back to step 310. For example, the server can receive one or more requests from one or more of the user devices. In a more particular example, a user can place a second bet using a user device. The user device can then transmit one or more requests including information about the second bet to the server.

In some implementations, the server can also update game information based on the received user requests and transmit updated asymmetric information to the console and/or multiple user devices. For example, the server can transmit game information that is available to all of the players to the console in the form of video content, audio content, messages, etc. The console can then cause such information to be displayed on the display device. In a more particular example, the server can transmit information about a second round of bets placed by multiple users to the console. In another more particular example, the server can transmit information about one or more community cards that have been dealt.

In some implementations, in response to determining that the game session is ended, process 300 can end at 316.

It should be understood that the above steps of the flow diagrams of FIG. 3 can be executed or performed in any order or sequence not limited to the order and sequence shown and described in the figures. Also, some of the above steps of the flow diagrams of FIG. 3 can be executed or performed substantially simultaneously where appropriate or in parallel to reduce latency and processing times. Furthermore, it should be noted that FIG. 3 is provided as examples only. At least some of the steps shown in these figures may be performed in a different order than represented, performed concurrently, or altogether omitted.

Accordingly, methods, systems, and media for enhancing multiplayer game sessions with asymmetric information are provided.

Although the disclosed subject matter has been described and illustrated in the foregoing illustrative implementations, it is understood that the present disclosure has been made only by way of example, and that numerous changes in the details of implementation of the disclosed subject matter can be made without departing from the spirit and scope of the disclosed subject matter. Features of the disclosed implementations can be combined and rearranged in various ways.

What is claimed is:

1. A method comprising:
capturing imagery of a display device by a mobile user device, the display device accessible by a plurality of mobile user devices;
identifying, at the mobile user device, information for accessing a multiplayer game hosted by a remote server using information represented in the captured imagery;
initiating, at the mobile user device, a game session for the multiplayer game with the server via a communication link using the information pertaining to the multiplayer game; and
displaying game information related to the multiplayer game on the display device while concurrently displaying joining instructions on the display device.

2. The method of claim 1, wherein the captured imagery includes a machine-readable label displayed by the display device, the machine-readable label representing the information for accessing the multiplayer game.

3. The method of claim 2, wherein the machine-readable label comprises a quick response (QR) code.

4. The method of claim 1, wherein the information represented in the captured imagery includes a visual representation of at least one of a uniform resource locator associated with the server or a network address associated with the server.

5. The method of claim 4, wherein initiating the game session for the multiplayer game comprises executing a web browser application at the mobile user device to access the at least one of the uniform resource locator or the network address.

6. The method of claim 5, further comprising:
receiving media content representing the game session from the server and presenting the media content to a user via the web browser application.

7. The method of claim 4, wherein the information represented in the captured imagery further includes one or more other parameters for accessing the multiplayer game at the server.

8. The method of claim 1, further comprising:
providing an indication of a location of the mobile user device to the server via the communication link; and
wherein the information for accessing the multiplayer game is displayed at the display device based on the indication of the location of the mobile user device.

9. The method of claim 1, further comprising:
providing an identifier of the display device from the mobile user device to the server responsive to identifying the display device as being on a network with the mobile user device.

10. A mobile user device comprising:
a display;
an optical sensor;
a processor coupled to the optical sensor and to the display; and
a memory coupled to the processor, the memory to store a set of instructions that, when executed by the processor, manipulate the processor to:
capture imagery of a display device separate from the mobile user device using the optical sensor, the display device accessible by a plurality of mobile user devices;
identify information for accessing a multiplayer game hosted by a remote server using information represented in the captured imagery;
initiate a game session for the multiplayer game with the server via a communication link using the information pertaining to the multiplayer game; and
display game information related to the multiplayer game on the display device while concurrently displaying joining instructions on the display device.

11. The mobile user device of claim 10, wherein the captured imagery includes a machine-readable label displayed by the display device, the machine-readable label representing the information for accessing the multiplayer game.

12. The mobile user device of claim 11, wherein the machine-readable label comprises a quick response (QR) code.

13. The mobile user device of claim 10, wherein the information represented in the captured imagery includes a visual representation of at least one of a uniform resource locator associated with the server or a network address associated with the server.

14. The mobile user device of claim 13, wherein instructions configured to manipulate the processor to initiate the game session for the multiplayer game comprise instructions to manipulate the processor to execute a web browser application at the mobile user device to access the at least one of the uniform resource locator or the network address.

15. The mobile user device of claim 14, wherein the instructions to manipulate the processor further include instructions to manipulate the processor to:
receive media content representing the game session from the server; and
present the media content to a user via the web browser application and the display of the mobile user device.

16. The mobile user device of claim 13, wherein the information represented in the captured imagery further includes one or more other parameters for accessing the multiplayer game at the server.

17. The mobile user device of claim 10, wherein the instructions to manipulate the processor further include instructions to manipulate the processor to:
provide an indication of a location of the mobile user device to the server via the communication link; and
wherein the information for accessing the multiplayer game is displayed at the display device based on the indication of the location of the mobile user device.

18. The mobile user device of claim 10, wherein the instructions to manipulate the processor further include instructions to manipulate the processor to:
provide an identifier of the display device from the mobile user device to the server responsive to identifying the display device as being on a network with the mobile user device.

19. A non-transitory computer-readable medium storing a set of instructions, wherein the set of instructions, when executed by a processor, are configured to manipulate the processor to:
capture imagery of a display device using an optical sensor of a mobile user device, the display device accessible by a plurality of mobile user devices;
identify information for accessing a multiplayer game hosted by a remote server using information represented in the captured imagery;
initiate a game session for the multiplayer game with the server via a communication link using the information pertaining to the multiplayer game; and
display game information related to the multiplayer game on the display device while concurrently displaying joining instructions on the display device.

20. The non-transitory computer-readable medium of claim 19, wherein:
the information represented in the captured imagery includes a visual representation of at least one of a uniform resource locator associated with the server or a network address associated with the server; and
instructions configured to manipulate the processor to initiate the game session for the multiplayer game comprise instructions to manipulate the processor to execute a web browser application at the mobile user device to access the at least one of the uniform resource locator or the network address.

21. The method of claim 1, further comprising:
determining that a second display device has availability for joining a multiplayer game session; and
directing a user device using the joining instructions to the second display device.

* * * * *